Sept. 13, 1960  E. RÖÖSLI  2,952,285
SCREWDRIVERS
Filed April 8, 1959
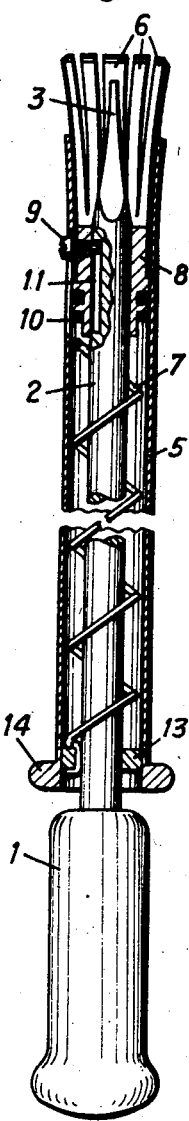
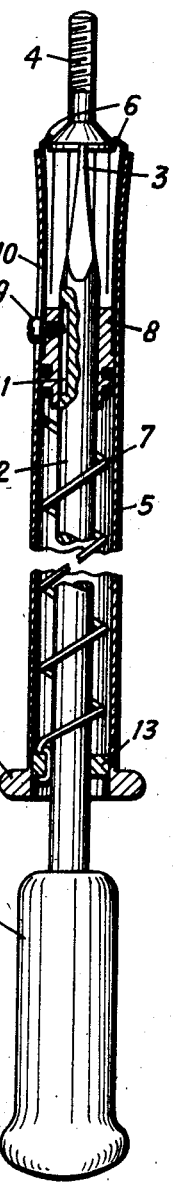
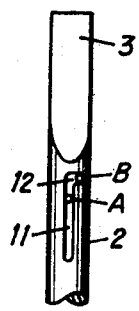
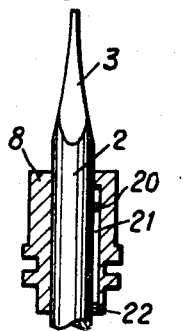
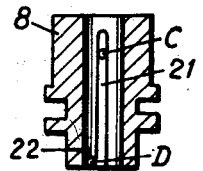
INVENTOR.
EMIL RÖÖSLI
BY United States Patent Office
2,952,285
Patented Sept. 13, 1960

2,952,285

SCREWDRIVERS

Emil Röösli, Zurich, Switzerland, assignor to Gebruder Gramiger A.G., Bazenheid/St. Gallen, Switzerland, a company of Switzerland Filed Apr. 8, 1959, Ser. No. 805,059

Claims priority, application Switzerland Dec. 9, 1958

3 Claims. (Cl. 145—52)

The present invention relates to a screwdriver and is particularly concerned with a screwdriver having a device for holding a screw securely on the screwdriver blade which device comprises a chuck having outwardly pretensioned jaws which jaws can be closed and opened by displacement of a sleeve arranged coaxially with the screwdriver shank. Screwdrivers with such holding devices are particularly useful in driving or withdrawing screws in relatively inaccessible places.

According to the present invention there is provided a screwdriver having a holding device for holding a screw against a tip of a blade of said screw driver, said device comprising a chuck member having gripping jaws which are pretensioned into an outward direction and are disposed adjacent said blade, said chuck member being surrounded by a sleeve which itself surrounds and is axially displaceable with respect to a shank member of said screwdriver said sleeve and chuck member being capable of limited axial relative displacement with respect to one another, spring means for biasing said sleeve and chuck member together so as to retract inwardly said gripping jaws, means for limiting displacement of said chuck member with respect to the blade in one direction to a position wherein the edges of said jaws are disposed in advance of said blade tip by an amount at least equal to the height of the head of said screw and retaining means for releasably retaining said chuck member in said position so as to allow upon displacement of said sleeve insertion of said screw head into said jaws, the arrangement being such that upon release of said retaining means said chuck member and sleeve are biased together so as to cause gripping of said screw head and the biasing thereof against said blade tip.

For a better understanding of the invention and to show how the same may be carried into effect reference will now be made to the accompanying drawings in which:

Figure 1 is a sectional view of a screwdriver with a screw holding device in accordance with the invention shown in an open position, Figure 2 is a sectional view of the screwdriver shown in Figure 1 showing a screw held fast by the holding device, Figure 3 shows a detail of the screwdriver shown in Figures 1 and 2, and Figure 4 together with Figure 5 show a detail of a modified form of the screwdriver according to Figures 1 and 2.

Referring to the drawings the screwdriver comprises a handle 1 fixedly connected to one end of a shank 2 the other end of the shank 2 terminating in a screw driver blade 3.

The screwdriver is furthermore provided with a screw holding device which is constructed as follows:

A cylindrical collar 8 coaxially surrounds the shank 2 and is axially displaceable thereon. A chuck comprising a plurality of spring jaws 6 fits over the collar 8 and is secured thereto by screw 9, the jaws 6 surrounding the blade 3 and being biased away from said blade 3.

A sleeve 5 coaxially surrounds the collar 8 and the lower portion of the jaws 6 adjacent the collar 8, the upper portion of the sleeve 5 being slightly outwardly flared. The sleeve 5 is axially displaceable with respect to the shank 2, the jaws 6 and the collar 8. The lower end of the sleeve 5 is disposed adjacent the handle 1 and is provided with a grip ring 14 around its lower periphery. A ring 13 coaxially surrounding the shank 2 and axially displaceable thereon is passed into the end of the sleeve 5 adjacent the handle 1. A tension spring 7 is fixedly held in the ring 13, the other end of the spring 7 being held in an annular groove in the collar 8.

The head of the screw 9 is free to move in a longitudinal slot 10 in the sleeve 5 whilst a small tip of the screw 9 remote from the head rides in a longitudinal groove 11 in the shank 2. The upper portion of the longitudinal groove 11 has a transverse extension 12 as shown in Figure 3.

In operation the screw holding device can easily be operated using only one hand. The sleeve 5 and the associated elements of the screw holding device are shifted towards the blade 3 by means of the gripping ring 14 until the tip of the screw 9 abuts against the upper end of the longitudinal groove 11 adjacent the extension 12. A small rotation of the gripping ring 14 causes the tip of the screw 9 to move into the extension 12 as indicated by position B in Figure 3. As a result, the chuck is held in such a position relative to the shank 2 in the longitudinal direction thereof that the ends of the jaws 6 are situated at a distance in front of the blade 3 which corresponds at least to the height of the screw head which is to be held. Then, if the sleeve 5 is now pulled towards the handle 1 against the force of the tension spring 7, the chuck opens owing to the pre-tension of its jaws 6, and the screw 4 which is to be held is placed on the blade 3. In order to close the chuck, the gripping ring 14 is now rotated in an opposite sense, so that the tip of the screw 9 is moved out of the extension 12 into the longitudinal groove 11. The sleeve 15 is then released. The spring 7 is thus able to urge the collar 8 and chuck back towards the handle 1 and to move the sleeve 5 forwards away from the handle 1. When this happens, the jaws 6 bend inwards and grip the head of the screw 4, and the forward end of the sleeve 5 slides over the jaws 6 and closes the chuck completely. The tip of the screw 9 thus takes up the position A shown in Figure 3 in the longitudinal groove 11.

The opening of the chuck and release of the screw can be carried out in two ways: either the screw holding device can be pushed forwards, so that the screw 4 is lifted away from the blade 3, and the chuck is again rotated with respect to the shank 2 by rotation of the gripping ring 14, and the sleeve 5 is pulled towards the handle 1. Alternatively, the sleeve 5 can be pulled towards the handle 1 directly from the position shown in Figure 2, until the jaws 6 can spring back so far under the pull of the spring 7 that they slide off the head of the screw 4.

In a further embodiment of a screwdriver according to Figures 4 and 5 the collar 8 comprises at its inner surface a longitudinal groove 21 whose lower end communicates with a transverse extension 22, a pin 20 fixed in the shank 2 projecting and riding in this groove. When this transverse extension 22 in the collar 8 is directed oppositely to the direction at the transverse extension 12 in the shank 2 in order to displace the pin 20 from the groove 21 (position C) into the transverse extension 22 (position D), the screwdriver can be manipulated in exactly the same manner as has been described in connection with the illustrated embodiment.

A screwdriver having a device for holding a screw such as is described hereinbefore can, of course, be used for screws with countersunk heads, cylindrical heads, round heads, and so on and even for grub screws of adequate diameter, in which case the jaws 6 can act on the threads.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. A screwdriver having a shank and a blade and having a holding device for holding a screw against said tip of a blade of said screw driver, said device comprising a chuck member having gripping jaws which are pretensioned into an outward direction and are disposed adjacent said blade, a sleeve surrounding said chuck member said chuck member surrounding and being axially displaceable with respect to said shank of said screwdriver, said sleeve and chuck member being capable of limited axial relative displacement with respect to one another, spring means for biasing said sleeve and chuck member together so as to retract inwardly said gripping jaws, means for limiting displacement of said chuck member with respect to the blade in one direction to a position wherein the edges of said jaws are disposed in advance of said blade tip by an amount at least equal to the height of the head of said screw, and retaining means for releasable retaining said chuck member in said position so as to allow upon displacement of said sleeve insertion of said screw into said jaws, the arrangement being such that upon release of said retaining means said chuck member and sleeve are biased together so as to cause gripping of said screw head and the biasing thereof against said blade tip, said means for limited displacement including a projection constituted by the tip of a screw secured in said chuck member, the head of said screw being arranged to slide in a longitudinal slot formed in said sleeve so as to limit relative axial displacement of said sleeve with respect to said chuck member.

2. A screwdriver according to claim 1, wherein said retaining means is constituted by a transverse extension of said first mentioned slot formed at an extremity thereof.

3. A screwdriver according to claim 1, wherein said spring means is constituted by a tension spring disposed within said sleeve and surrounding said shank member, one end of said spring being secured to the end of said sleeve remote from said blade whilst the other end of said spring is secured to said chuck member.

References Cited in the file of this patent

UNITED STATES PATENTS

| | | |
|---|---|---|
| 1,039,751 | Ingram | Oct. 1, 1912 |
| 1,497,642 | Rowe | June 10, 1924 |
| 1,687,788 | Pindus | Oct. 16, 1928 |
| 2,302,691 | Green | Nov. 24, 1942 |